3,403,026
PHOTOGRAPHIC SILVER HALIDE EMULSIONS CONTAINING N,α-ALKYLENE BRIDGED MEROCYANINE SENSITIZING DYES
Gene L. Oliver, Rochester, N.Y., assignor to Eastman Kodak Company, Rochester, N.Y., a corporation of New Jersey
No Drawing. Filed Dec. 28, 1964, Ser. No. 421,661
7 Claims. (Cl. 96—105)

ABSTRACT OF THE DISCLOSURE

Novel merocyanine dyes containing an N,α-alkylene bridge, useful as spectral sensitizers for photographic silver halide emulsions, are obtained by reacting a pyrroloindolium or benzopyrroloindolium cyclammonium salt, such as 1-anilinomethylene-9,9-dimethyl-2,3-dihydro-1H, 9H-pyrrolo[1,2-a]indolium bromide, for example, with a 5- or 6-membered heterocyclic ketone, such as 3-ethylrhodanine, 3-methyl-1-phenyl-2-pyrazolin-5-one or 1-ethyl-2-thiobarbituric acid, for example. 5-(9,9-dimethyl-2,3-dihydro 9H-pyrrolo[1,2-a]-indol-1-ylmethylene-3-ethylrhodanine and 5-(9,9-dimethyl-2,3-dihydro-9H-pyrrolo[1,2-a]-indol-1-ylmethylene-1-ethyl-2-thiobarbituric acid, for example, are illustrative of the merocyanine dye compounds.

---

This invention relates to a new class of dyes and more particularly to certain merocyanine dyes containing an N,α-alkylene bridge, to photographic silver halide emulsions and elements sensitized therewith, and to methods for preparing these dyes.

The new class of merocyanine dyes of the invention include those represented by the following general formula:

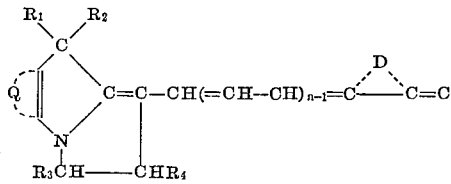

wherein $n$ represents an integer of from 1 to 4, $R_1$ and $R_2$ each represents the same or different alkyl group, e.g., methyl, ethyl, propyl, isopropyl, butyl, amyl, etc., $R_3$ and $R_4$ each represents the hydrogen atom or the same or different alkyl group, e.g., methyl or ethyl, Q represents the non-metallic atoms required to complete an aromatic ring such as a benzene ring, said ring completing a 9,9-dialkyl - 2,3 - dihydro-1H,9H-pyrrolo[1,2-a]-indolium salt nucleus, or the non-metallic atoms required to complete a naphthalene ring, said ring when 1,2-naphtho completing a 11,11-dialkyl-8,9-dihydro-10H,11H-benzo-[e]pyrrolo[1,2-a]indolium salt, or when 2,3-naphtho completing an 11,11 - dialkyl-2,3-dihydro-1H,11H-benzo[f]pyrrolo[1, 2-a]indolium salt, or when 2,1-naphtho completing a 7,7-dialkyl-9,10-dihydro-7H,8H-benzo[g]pyrrolo[1,2-a] indolium salt or said benzene and naphthalene rings substituted by one or more substituents such as an alkyl group, e.g., methyl, ethyl, propyl, isopropyl, butyl, benzyl, etc., an alkoxy group, e.g., methoxy, ethoxy, propoxy, isopropoxy, butoxy, etc., an aryl group, e.g., phenyl, tolyl, etc., an aryloxy group, e.g., phenoxy, etc., a halogen, e.g., chlorine, bromine etc., or a dialkylamino group wherein the alkyl radicals are the same or different radicals, e.g., methyl, ethyl, propyl, isopropyl, butyl, etc., and the like, and D represents the nonmetallic atoms required to complete a 5- to 6-membered heterocyclic nucleus such as those selected from the class consisting of a 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.), an isoxazolone nucleus (e.g., 3-phenyl-5(4H)-isoxazolone, 3-methyl-5-(4H)-isoxazolone, etc.), an oxindole nucleus (e.g., 1-alkyl-2-,3-dihydro-2-oxindoles, etc.), a 2,4,6-triketohexahydropyrimidine nucleus (e.g., barbituric acid or 2-thiobarbituric acid as well as their 1-alkyl (e.g., 1-methyl, 1-ethyl, 1-propyl, 1-heptyl, etc.), or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl, etc.), or 1,3-diaryl (e.g., 1,3-diphenyl, 1,3-di(p-chlorophenyl), 1,3-di(p-ethoxycarbonylphenyl, etc.), or 1-aryl (e.g., 1-phenyl, 1-p-chlorophenyl, 1-p-ethoxycarbonylphenyl, etc.) or 1-alkyl-3-aryl (e.g., 1-ethyl-3-phenyl, 1-heptyl-3-phenyl, etc. derivatives), a rhodanine nucleus (i.e., 2-thio-2,4-thiazolidinedione series), such as rhodanine, 3-alkylrhodanines (e.g., 3-ethylrhodanine, 3-allylrhodanine, etc.), 3-carboxyalkylrhodanines (e.g., 3-(2-carboxyethyl)-rhodanine, 3-(4-carboxybutyl)rhodanine, etc.), 3-sulfoalkyl-rhodanines (e.g., 3-(2-sulfoethyl)rhodanine, 3-(3 - sulfopropyl)rhodanine, 3 - (4 - sulfobutyl)rhodanine, etc.), or 3-arylrhodanines (e.g., 3-phenylrhodanine, etc.), etc., a 2(3H)-imidazo[1,2-a]pyridone nucleus, a 5,7-dioxo-6,7 - dihydro - 5 - thiazolo[3,2 - a]pyrimidine nucleus (e.g., 5 -,7 - dioxo-3-phenyl-6,7-dihydro-5-thiazolo[3,2-a] pyrimidine, etc.), a 2-thio-2,4-oxazolidinedione nucleus (i.e., a 2-thio-2,4(3H,5H)-oxazoledione nucleus) (e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3 - (3-carboxypropyl)-2-thio-2,4-oxazolidinedione, etc.), a thianaphthenone nucleus (e.g., 3(2H)-thianaphthenone, etc.), 2-thio-2,5-thiazolidinedione nucleus (i.e., the 2-thio-2,5(3H,4H)-thiazoledione nucleus) (e.g., 3-ethyl-2-thio-2,5-thiazolidinedione, etc.), a 2,4-thiazolidinedione nucleus (e.g., 2,4-thiazolidinedione, 3-ethyl-2,4-thiazolidinedione, 3 - phenyl-2,4-thiazolidinedione, 3-α-naphthyl-2,4-thiazolidinedione, etc.), a thiazolidinone nucleus (e.g., 4-thiazolidinone, 3-ethyl-4-thiazolidinone, 3-phenyl - 4 - thiazolidinone, 3-α-naphthyl-4-thiazolidinone, etc.), a 2-thiazolin-4-one nucleus (e.g., 2-ethyl-mercapto-2 - thiazolin-4-one, 2-alkylphenylamino-2-thiazolin-4-one, 2-diphenylamino-2-thiazolin-4-one, etc.), a 2-imino-4-oxazolidinone (i.e., pseudohydantoin) nucleus series, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1 - ethyl-3-phenyl-2,4-imidazolidinedione, ethyl - 3α-naphthyl-2,4-imidazolidinedione, 1,3-diphenyl-2,4-imidazolidinedione, etc.), a 2-thio-2,4-imidazolidinedione (i.e., 2-thiohydantoin) nucleus (e.g., 2 - thio - 2,4 - imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1 - ethyl-3-α-naphethyl-2-thio-2,4-imidazolidinedione, 1,3-diphenyl-2-thio-2,4-imidazolidinedione, etc.), a 2-imidazolin - 5 - one nucleus (e.g., 2 - propylmercapto-2-imidazolin-5-one, etc.), etc.

It is, accordingly, an object of the invention to provide a new class of merocyanine dyes as defined above. A further object is to provide methods for making these new dyes. Another object is to provide photographic silver halide emulsions sensitized with at least one of these new dyes, and photographic elements prepared with such sensitized emulsions. Other objects will become apparent from a consideration of the description and the examples.

In accordance with the invention, I prepare the new merocyanine dyes represented by above Formula I for example, by reacting (condensing) a compound having the following general formula:

II. 

wherein D is as previously defined (e.g. 3-ethylrhodanine, 3 - methyl-1-phenyl-2-pyrazolin-5-one, 1-ethyl-2-thiobarbituric acid, 3-ethyl-1-phenyl-2-thiohydantoin, 3-ethyl-2-thio-2,4-oxazolidinedione, etc.), with a cyclammonium salt represented by the following general formula:

III. 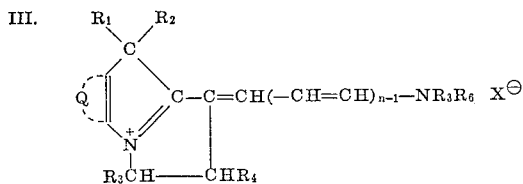

wherein $n$, $R_1$, $R_2$, $R_3$, $R_4$ and Q are as previously defined, and wherein $R_5$ represents an aryl group, e.g., phenyl, tolyl, etc., $R_6$ represents an acyl group, e.g., acetyl, propionyl, benzoyl, etc., and X represents an acid anion (e.g., chloride, bromide, iodide, thiocyanate, sulfamate, methyl sulfate, ethyl sulfate, perchlorate, p-toluenesulfonate, etc.).

The condensations can be accelerated by heating up to reflux temperatures of the reaction mixture, preferably in an inert solvent such as methanol, ethanol, propanol, butanol, acetone, 1,4-dioxane, dimethyformamide, pyridine, quinoline, isoquinoline, etc. The reactants can be employed with an excess of one or the other, i.e., greater than the stoichiometrically calculated equivalents, but preferably in approximately equimolar proportions for the best results. Advantageously, the condensations are carried out in the presence of a basic condensing agent such as a trialkylamine, e.g., triethylamine, tri-n-propylamine, tri-n-butylamine, etc., N-methylpiperidine, N-ethylpiperidine, N,N-dimethylaniline, etc.

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrolidone, cellulose ethers, partially hydrolyzed cellulose acetate and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of my new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of my dyes, 10 to 20 mgs. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-silver chloride emulsions, and the like, somewhat larger concentrations of dye may be necessary to secure optimum sensitizing effect. While the preceding has dealt with emulsions comprising gelatin, it will be understood that these remarks apply generally to any emulsions wherein part or all of the gelain is substituted by another suitable hydrophilic colloid such as mentioned above.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen 2,540,085, granted Feb. 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U.S. 2,540,-086, granted Feb. 6, 1951), potassium chloropalladate (R. E. Stauffer et al. U.S. 2,598,079, granted May 27, 1952), etc., or mixture of such sensitizers; anti-foggants, such as ammonium chloroplatinate (A. P. H. Trivelli et al. U.S. 2,566,245, granted Aug. 28, 1951), ammonium chloroplatinite (A. P. H. Trivelli et al. U.S. 2,566,263, granted Aug. 28, 1951), benzotriazole, nitrobenzimidazole, 5-nitroindazole, benzidine, mercaptans, etc. (see Mees, "The Theory of the Photographic Process," Macmillan Pub., 1942, p. 460), or mixtures thereof; hardeners, such as formaldehyde (A. Miller U.S. 1,763,533, granted June 10, 1930), chrome alum (U.S. 1,763,533), glyoxal (J. Brunken U.S. 1,870,354, granted Aug. 9, 1932), dibromacrolein (O. Block et al. British 406,750, accepted Mar. 8, 1934), etc.; color couplers, such as those described in I. F. Salminen et al. U.S. Patent 2,423,730, issued 1947, Spence and Carroll U.S. Patent 2,640,776, issued June 2, 1953, etc.; or mixtures of such addenda. Dispersing agents for color couplers, such as those set forth in U.S. patents to E. E. Jelley et al. 2,322,027, granted June 15, 1943, and L. D. Mannes et al. 2,304,940, granted Dec. 15, 1942, can also be employed in the above-described emulsions.

The following examples will serve to illustrate more fully the manner of preparing the new class of merocyanine dyes of the invention.

Example 1 (A) 5-(9,9-dimethyl-2,3-dihydro-9H-pyrrolo[1,2-a]indol-1-ylmethylene)-3-ethylrhodanine

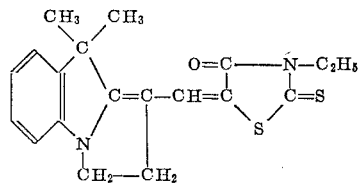

1-anilinomethylene-9,9-dimethyl-2,3 - dihydro - 1H,9H-pyrrolo[1,2-a]indolium bromide (1.11 g., 3 mmol.), 3-ethylrhodanine (0.58 g., 3 mmol.), acetic anhydride (0.42 ml., 4.5 mmol.), triethylamine (0.63 ml., 4.5 mmol.), and pyridine (5 ml.) were refluxed for five minutes and cooled. The dye was precipitated as an oil by the addition of water (25 ml.). The addition of a little methanol caused the dye to precipitate. After chilling, it was filtered, washed with methanol, and dried. The physical data for this dye are given under (A) in Table I.

Several other dyes were prepared similarly (characteristics in Table I:)

1 (B) 4-(9,9-dimethyl-2,3-dihydro-9H-pyrrolo[1,2-a]indol-1-ylmethylene)-3-methyl-1-phenyl-2-pyrazolin-5-one
1 (C) 5-(9,9-dimethyl-2,3-dihydro-9H-pyrrolo[1,2-a]indol-1-ylmethylene)-1-ethyl-2-thiobarbituric acid
1 (D) 5-(9,9-dimethyl-2,3-dihydro-9H-pyrrolo[1,2-a]indol-1-ylmethylene)-3-ethyl-1-phenyl-2-thiohydantoin
1 (E) 5-(9,9-dimethyl-2,3-dihydro-9H-pyrrolo[1,2-a]indol-1-ylmethylene)-3-ethyl-2-thio-2,4-oxazolidinedione

TABLE I.—CHARACTERISTICS OF MEROCARBOCYANINES IN EXAMPLE 1

| Dye | Crude yield, percent | Recrystallized from— | Melting point (corr. °C. (dec.) |
|---|---|---|---|
| 1 (A) | 77 | Pyridine/methanol | 268–269 |
| 1 (B) | 72 | Ethanol | 235–236 |
| 1 (C) | 72 | Pyridine/methanol | 275.5–276.5 |
| 1 (D) | 76 | Pyridine/aq. methanol | 226–228 |
| 1 (E) | 78 | Pyridine/methanol | 212–213 |

By substituting the indolium salt in the above examples, with an equivalent amount of, for example, 10-anilinomethylene-11,11-dimethyl-8,9-dihydro - 10H,11H - benzo[e]pyrrolo[1,2-a]indolium bromide, the corresponding mero-cyanine dyes are obtained.

This sensitizing effect of the dyes of Example 1 above is illustrated in the following Table II where the sensitizing range and sensitizing maximum values are shown for these dyes. The dyes were tested in a silver bromoiodide (Br I) emulsion containing 0.77 mole percent iodide of the type described by Trivelli and Smith, Phot. Journal, 79, 330 (1939). The dyes, dissolved in suitable solvents, were added to separate portions of the emulsion in amounts in the range from about 40 to 130 mg./mole of silver halide. After digestion at 50° C. for 10 minutes, the emulsions were coated at a coverage of 432 mg. of Ag/ft.$^2$ on a cellulose acetate film support. A sample of each coating was exposed on a sensitometer and to a wedge spectrograph, processed for 3 minutes in conventional developer, fixed, washed and dried. These dyes were also tested in a silver chlorobromide (ClBr) emulsion following the above procedure.

Although the above test procedure shows coatings on only cellulose acetate supports, it is to be understood that my photographic silver halide emulsions are coated advantageously on any of the support materials used in photographic elements, including glass, paper, cellulose acetate, cellulose nitrate, and synthetic film-forming resinous materials, such as, the polystyrene, the polyesters, the polyamides, etc.

TABLE II.—PHOTOGRAPHIC SENSITIZING DATA

| Example | Emulsion | Dye sensitizes to (mμ) | Maximum sensitization (mμ) |
|---|---|---|---|
| 1 (A) | ClBr | 670 | 625 |
|  | Br I | 670 | 620 |
| 1 (B) | ClBr | 600 | 565 |
|  | Br I | 600 | 565 |
| 1 (C) | ClBr | 665 | 615 |
|  | Br I | 655 | 625 |
| 1 (D) | ClBr | 660 | 595 |
|  | Br I | 640 | 595 |
| 1 (E) | ClBr | 640 | 590 |
|  | Br I | 645 | 610 |

The new class of merocyanine dyes of the invention are particularly useful for sensitizing silver halide emulsions to maximum sensitization in the region of the spectrum of about 565 mμ to 625 mμ, as indicated by the values given in above Table II.

The following additional examples illustrate the preparation of the intermediate compounds employed in the preparation of the dyes of the invention.

Example A.—α-Isobutyryl-γ-butyrolactone

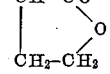

(a) To a solution of sodium ethoxide in absolute ethanol (125 ml.), prepared from sodium (8.5 g., 0.37 mol.), ethyl isobutyrylacetate (57.5 g., 0.364 mol.) was added with stirring and cooling. After stirring for over an hour, the mixture was chilled and an ice-cold solution of ethylene oxide (27 ml., 0.545 mol.) in absolute ethanol (25 ml.) added over a 30 minute period. The reaction mixture was stirred overnight. Acetic acid (30 ml.) was then added and the solvents removed under reduced pressure. The residue was taken up in water and extracted three times with ether. The combined ether extracts were dried over anhydrous magnesium sulfate and the ether evaporated. The product distilled at 70–77° C. (2 mm.) yielding 27.9 g. (49%).

(b) Methyl isobutyrate (250 ml., 2.18 mol.) and about two-thirds of the total amount of sodium hydride (145 g. of a 54% dispersion in mineral oil, 3.26 mol.) were heated in a 3 l. flask by an oil bath at 100–110° C. With mechanical stirring a solution of γ-butyrolactone (140 ml., 1.63 mole) in 270 ml. xylene was added at a rate of about one drop per second over 4½ hours. When about ⅓ of the butyrolactone solution had been introduced, the rest of the sodium hydride was added. As the mixture thickened, it was diluted proportionwise with xylene (500 ml.). One hour after the addition of the butyrolactone solution was complete, the mixture was cooled to 40° C. and ethanol (80 ml.) was added to destroy any excess sodium hydride. After dilution with xylene (100 ml.) and ether (300 ml.), much ice was added and the alkaline mixture was neutralized with conc. hydrochloric acid (275 ml.). The layers were separated and the aqueous layer extracted with ether. The combined organic layers were washed successively with sodium bicarbonate until the effluent aqueous solution had a pH>7, again with water, and then dried over magnesium sulfate. When the solvents were removed under reduced pressure, the mixture separated into two layers, the top being mineral oil which was removed. The resulting solution was distilled through a 9-inch Vigreux column, the fraction boiling at 95–102° C. (0.07 mm.) accepted as product. The yield was 90 g. (35%).

Example B.—5-Hydroxy-2-methyl-3-hexanone
$(CH_3)_2CHCOCH_2CH_2CH_2OH$

α-Isobutyryl-γ-butyrolactone (27.9 g., 0.179 mol.), water (100 ml.) and concentrated hydrochloric acid (12.8 ml.) were heated with vigorous stirring to 70° C. and allowed to cool over two hours. The heating was repeated and the mixture stirred another two hours. The solution was neutralized and then saturated with potassium carbonate. The oil which separated was extracted twice with chloroform and the extract dried over anhydrous magnesium sulfate. After evaporation of the chloroform, the product distilling at 94–122° C. (16 mm.) was collected (15.0 g., 60%).

Example C.—5-Acetoxy-2-methyl-3-hexanone
$(CH_3)_2CHCOCH_2CH_2CH_2OCOCH_3$

α-Isobutyryl-γ-butyrolactone (39 g., 0.25 mol.), potassium acetate (49 g., 0.5 mol.) and acetic acid (200 ml.) were refluxed for 16 hours. The mixture was concentrated to ½ its original volume, then ice, water and ether added. It was neutralized with conc. hydrochloric acid (42 ml.). The ether layer was separated and the aqueous solution extracted again with ether. The ether layer was washed with aqueous potassium carbonate, dried over magnesium sulfate, and the ether evaporated. The product boiled without forerun at 109–116° C. (10 mm.). Yield 30.8 g. (72%).

Example D.—2-(3-Acetoxypropyl)-3,3-dimethyl-3H-indole

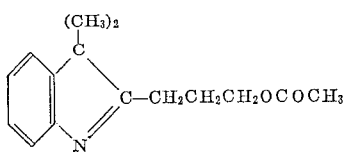

5-acetoxy-2-methyl-3-hexanone (17.2 g., 0.1 mol.), phenylhydrazine (10.8 g., 0.1 mole) and acetic acid (1 ml.) were shaken together, the reaction proceeding exothermically. After water began to separate, the mixture was heated on the steam bath ½ hour, then cooled and diluted with two volumes of ether. The water layer was run off and the ether layer dried over magnesium sulfate. The ether was evaporated and the resulting oil was treated with acetic acid (30 ml.) and conc. sulfuric acid (8 drops). This mixture was heated on the steam bath but was removed when the temperature of the reaction began to rise rapidly. When the heat evolution subsided, the mixture was refluxed for 30 minutes and then cooled. Ice, water and ether were added and the mixture made strongly basic with 50% aqueous sodium hydroxide solution. The ether layer was separated and combined with two subsequent ether extracts from the aqueous layer. It was dried over magnesium sulfate and ether evaporated. The product, 17.2 g. (70%) was obtained by distillation at 143–152° C. (1.5 mm.).

Example E.—2-(3-acetoxypropyl)-3,3-dimethyl-3H-benz[e]indole

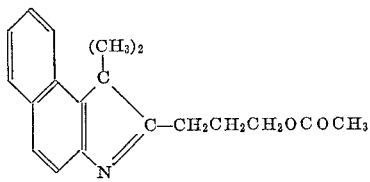

5-acetoxy-2-methyl-3-hexanone (21.5 g., 0.125 mol.) and 2-naphthylhydrazine (19.7 g., 0.125 mol.) were warmed together on the steam bath, then acetic acid (1 ml.) added. After heating on the steam bath for 1¾ hours, the mixture was cooled and 2 volumes of ether were added. The water which had separated was drawn off and the ether layer dried over magnesium sulfate. The residue left after evaporation of the ether was treated with acetic acid (40 ml.) and conc. sulfuric acid (10 drops). The mixture was heated on the steam bath whereupon the temperature rose gradually to 135° C. After the reaction subsided, the mixture was refluxed for 30 minutes. On cooling overnight, crystallization began. The mixture was diluted with water, filtered, the precipitate resuspended in water and the solution made basic with sodium hydroxide. The solid was filtered off, washed with water and dried. The yield was 28.7 g. (78%). It melted at 126–128° C. after recrystallization from ethyl acetate.

Example F.—2-(3-hydroxypropyl)-3,3-dimethyl-3H-benz[e]indole

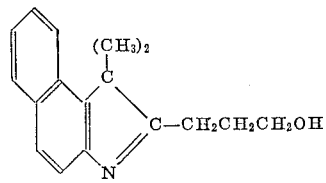

2-(3-acetoxypropyl)-3,3-dimethyl-3H-benz[e]indole (37.6 g., .127 mol.) was saponified by refluxing for ½ hour with a solution of potassium hydroxide (8.4 g., .127 mole) in ethanol (150 ml.). After the alcohol was removed in vacuo, water was added which caused the product to separate as an oil. On chilling, the oil crystallized and was filtered off. After drying in vacuo, the product was suspended in hot benzene, filtered, the filtrate diluted with ligroin (B.P.>100° C.) and cooled. The crystalline product was filtered off and dried. The yield was 29 g. (90%) of compound melting at 103–105° C. after recrystallization from ethyl acetate.

Example G.—2-(3-hydroxypropyl)-3:3-dimethyl-3H-indole

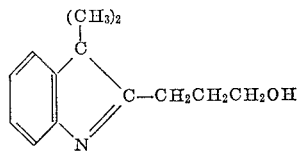

A solution of 2(3-acetoxypropyl)-3,3-dimethyl-3H-indole (43.2 g., 0.176 mol.) and potassium hydroxide (11.6 g., 0.176 mol.) in ethanol (200 ml.) was refluxed for 35 minutes. The ethanol was evaporated and the residue taken up in water (300 ml.) from which the product crystallized on standing in the refrigerator overnight. It was filtered off and dried. Yield 29.3 g. (82%). After recrystallization from ethyl acetate it melted at 98–99° C.

Example H.—(a) 9,9-dimethyl-2,3-dihydro-1H,9H-pyrrolo[1,2-a]indolium bromide

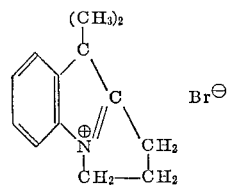

5-hydroxy-2-methyl-3-hexanone (15.0 g., 0.115 mol.), phenylhydrazine (11.4 ml., 0.115 mol.) and acetic acid (10 drops) were heated on the steam bath for 1½ hours. Ether (100 ml.) was added and the water which separated during the reaction extracted. The ether layer was dried over MgSO₄ and the solvent evaporated. The phenylhydrazone residue was treated with acetic acid (40 ml.) and sulfuric acid (1 drop) and warmed gently until the reaction was self-supporting. After the reaction subsided it was heated on the steam bath for a half-hour. The cooled mixture was poured on ice and made strongly alkaline with 40% sodium hydroxide. The viscous oil formed was extracted with ether twice. The ether extracts were dried over anhydrous magnesium sulfate and the solvent evaporated. The residue, containing primarily 2-γ-hydroxypropyl-3,3-dimethyl-3H-indole, was taken up in 50 ml. 30% hydrogen bromide in acetic acid, heated on the steam bath for two hours, and refluxed one hour. The product was precipitated with ether and the solvents decanted. After washing with ether the residue was treated with 5% aqueous sodium carbonate and extracted with ether. The ether layer was dried over anhydrous magnesium sulfate and evaporated. The residue was treated with 15 ml. 30% hydrogen bromide in acetic acid. On the addition of acetone, crystals of the product separated and were filtered off. The yield of the quaternary salt was 9.45 g. (30.9%), M.P. 173–175° C.

(b) 2-(3-hydroxypropyl)-3,3-dimethyl-3H-indole (20.3 g., 0.1 mole) was heated overnight on the steam bath with 30% hydrogen bromide in acetic acid (108 g., 0.4 mole) and thereafter refluxed one hour. The mixture was chilled and the product precipitated with ether. The semi-solid residue was washed twice with ether and then stirred with acetone from which it crystallized. The quaternary salt was filtered, washed with acetone and dried. The yield was 17.3 g. (65%), M.P. 173–175° C.

Example I.—1-Anilinomethylene-9,9-dimethyl-2,3-dihydro-1H,9H-pyrrolo[1,2-a]indolium bromide

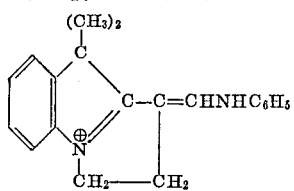

9,9 - dimethyl - 2,3 - dihydro - 1H,9H - pyrrolo[1,2-a] indolium bromide (17.3 g., .065 mole) and o-ethylisoformanilide (38.7 g., 0.26 mole) in n-butyl alcohol were refluxed 45 minutes and cooled. The mixture was diluted to about 500 ml. with ether. The solvent was decanted from the resulting tarry residue which was then made to crystallize by stirring with acetone. The precipitate was filtered and dried. The yield was 10.8 g.; another 1.2 g. was recovered from the filtrate by addition of ether, making a total of 50%.

By substituting the indolium bromide in the above example with 11,11-dimethyl-8,9-dihydro-10H,11H-benzo[e]-pyrrolo[1,2-a]indolium bromide or with 11,11-dimethyl-2,3-dihydro - 1H,11H - benzo[f]pyrrolo[1,2-a] indolium bromide, or with 7,7-dimethyl-9,10-dihydro-7H,8H-benzo[g]pyrrolo[1,2-a]-indolium bromide, the corresponding anilinomethylene derivatives are obtained.

Example J.—11,11 - dimethyl - 8,9 - dihydro - 10H,11H-benzo[e]pyrrolo-[1,2-a]indolium bromide

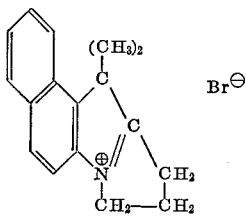

2-(3-hydroxypropyl)-3,3-dimethyl - 3H - benz[e]indole (16.5 g., 0.065 mol.) was heated with 30% hydrobromic acid in acetic acid (70 g., 0.26 mol.) on the steam bath for 16 hours. A small amount of black solid was filtered off. When the filtrate was treated with ether, a residue separated which was further washed with ether. This residue crystallized when stirred with acetone. It was filtered and washed with acetone.

The new class of merocyanine dyes of the invention has been illustrated above with certain preferred examples. However, other species coming under the definition of Formula I can be prepared in accordance with the above-described procedure, and these also have been found to have generally similar characteristics and are suitable for sensitizing photographic silver halide emulsions.

The invention has been described in detail with particular reference to preferred embodiments thereof, but it will be understood that variations and modifications can be effected within the spirit and scope of the invention as described hereinabove and as defined in the appended claims.

I claim:
1. A photographic silver halide emulsion containing at least one merocyanine dye selected from those represented by the following general formula:

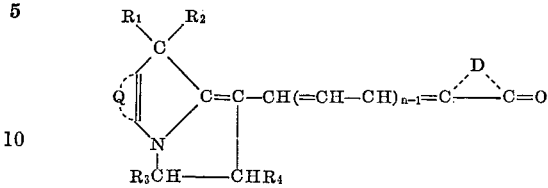

wherein $n$ represents an integer of from 1 to 4, $R_1$ and $R_2$ each represents an alkyl group, $R_3$ and $R_4$ each represents a member selected from the class consisting of the hydrogen atom, a methyl group, and an ethyl group, Q represents the nonmetallic atoms required to complete an aromatic ring selected from the class consisting of a benzene ring and a naphthalene ring, and D represents the non-metallic atoms required to complete a heterocyclic nucleus selected from the class consisting of a 2-pyrazolin-5-one nucleus, an isoxazolone nucleus, an oxindole nucleus, a barbituric acid nucleus, a 2-thiobarbituric acid nucleus, a rhodanine nucleus, a 2(3H)-imidazo-[1,2-a]pyridone nucleus, a 5,7-dioxo-6,7-dihydro-5-thiazolo-[3,2-a]pyrimidine nucleus, a 2-thio-2,4-oxazolidine-dione nucleus, a thianaphthenone nucleus, a 2-thio-2,5-thiazolidinedione nucleus, a 2,4-thiazolidinedione nucleus, a thiazolidinone nucleus, a 2-thiazolin-4-one nucleus, a 2-imino-2,4-oxazolidinone nucleus, a 2,4-imidazolidine-dione nucleus, a 2-thio-2,4-imidazolidinedione nucleus, and a 2-imidazolin-5-one nucleus.

2. A photographic silver halide emulsion containing the dye 5-(9,9-dimethyl-2,3-dihydro-9H-pyrrolo[1,2-a] indol-1-ylmethylene)-3-ethylrhodanine.

3. A photographic silver halide emulsion containing the dye 4-(9,9-dimethyl-2,3-dihydro-9H-pyrrolo-[1,2-a] indol-1-ylmethylene-3-methyl-1-phenyl-2-pyrazolin-5-one.

4. A photographic silver halide emulsion containing the dye 5-(9,9-dimethyl-2,3-dihydro-9H-pyrrolo-[1,2-a] indol-1-ylmethylene)-1-ethyl-2-thiobarbituric acid.

5. A photographic silver halide emulsion containing the dye 5-(9,9-dimethyl-2,3-dihydro-9H-pyrrolo-[1,2-a] indol-1-ylmethylene)-3-ethyl-1-phenyl-2-thiohydantoin.

6. A photographic silver halide emulsion containing the dye 5-(9,9-dimethyl-2,3-dihydro-9H-pyrrolo-[1,2-a] indol-1-ylmethylene)-3-ethyl-2-thio-2,4-oxazolidinedione.

7. A photographic element comprising a support coated with at least one layer containing a photographic silver halide emulsion of claim 1.

References Cited

UNITED STATES PATENTS

| | | | |
|---|---|---|---|
| 2,839,403 | 6/1958 | Knott | 96—102 |
| 3,243,298 | 3/1966 | Libeer et al. | 96—105 |
| 3,282,932 | 11/1966 | Lincoln et al. | 96—106 |

FOREIGN PATENTS

| | | |
|---|---|---|
| 615,205 | 1/1949 | Great Britain. |

J. TRAVIS BROWN, *Primary Examiner.*